United States Patent [19]

Haines et al.

[11] 4,301,674

[45] Nov. 24, 1981

[54] SMOKE DETECTOR TESTER

[76] Inventors: William H. Haines, 5240 Topeka Dr., Tarzana, Calif. 91356; Leon C. Cooper, 31316 Via Colinas, Westlake Village, Calif. 91361

[21] Appl. No.: 111,826

[22] Filed: Jan. 14, 1980

[51] Int. Cl.³ .................................... G01M 19/00
[52] U.S. Cl. ...................................... 73/1 G; 222/4; 252/305
[58] Field of Search ............... 73/1 G; 222/4; 252/305

[56] References Cited

U.S. PATENT DOCUMENTS 3,499,723  3/1970  Hamilton et al. ............... 252/305
3,693,401  9/1972  Purt et al. ...................... 73/1 G
3,729,979  5/1973  Wiberg ........................... 73/1 G
3,985,868  10/1976  Cory, Jr. et al. ................. 222/4

Primary Examiner—S. Clement Swisher

[57] ABSTRACT

A smoke detector tester is disclosed herein having a hand held aerosol container for holding under pressure a quantity of spray emitted from the container by a finger valve in the form of an aerosol cloud of known particle distribution within the sensing area of a smoke detector undergoing test. The particle size distribution within the aerosol cloud simulates the aerosol particle sizes that are emitted during the early stages of the process of combustion. The tester thus provides a true functional test of the smoke detector's sensing ability.

3 Claims, 4 Drawing Figures

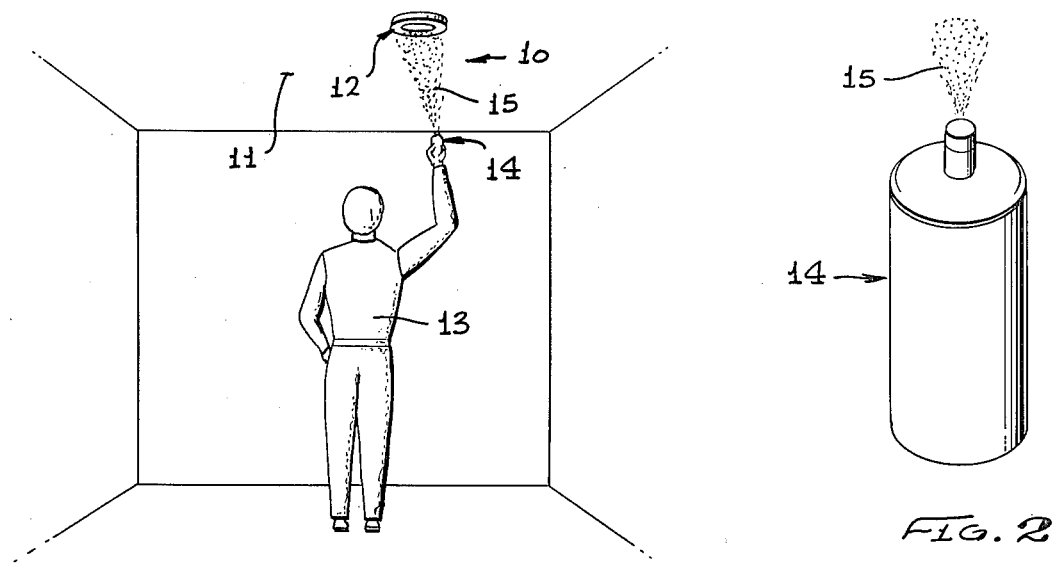
FIG. 1
FIG. 2
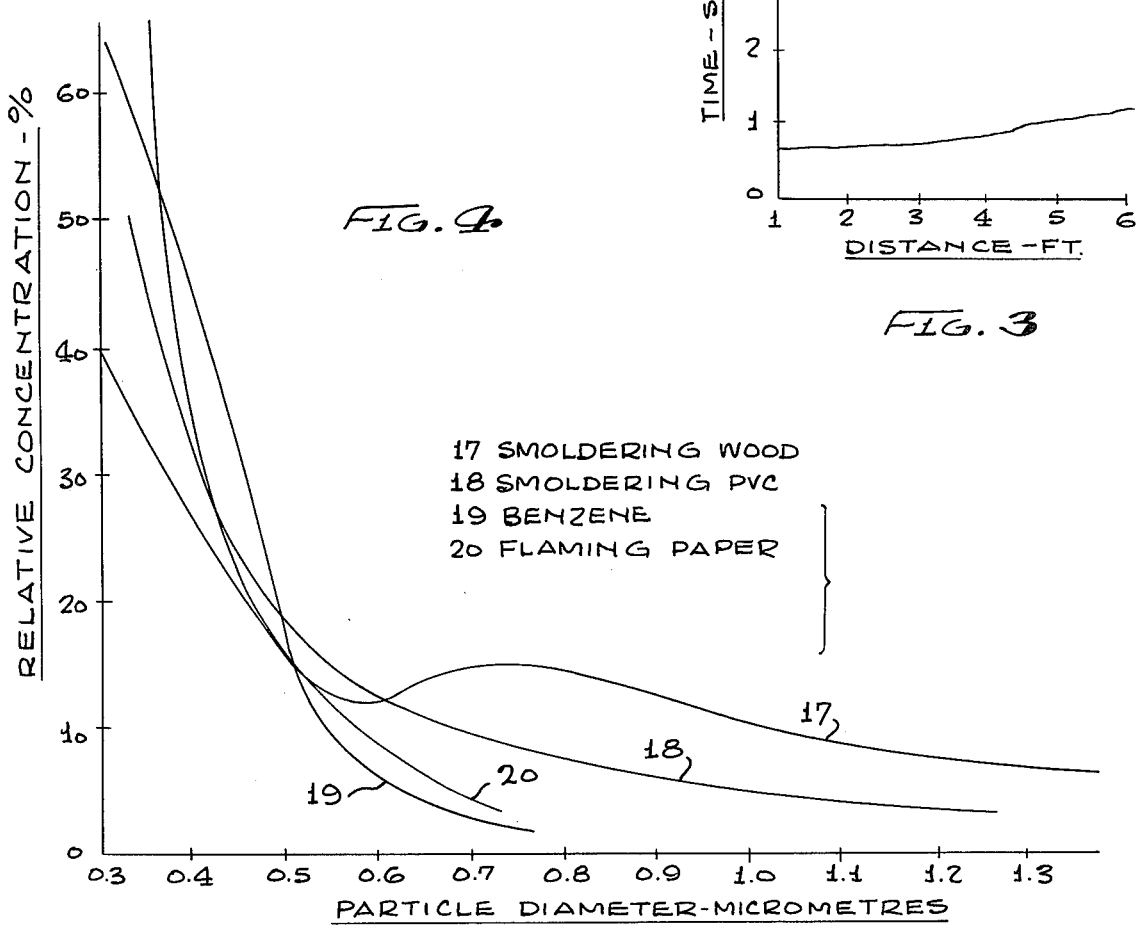
FIG. 4
FIG. 3
17 SMOLDERING WOOD
18 SMOLDERING PVC
19 BENZENE
20 FLAMING PAPER

SMOKE DETECTOR TESTER

BACKGROUND OF THE INVENTION

1. Field of the Invention

This invention relates to apparatus for testing smoke detectors of both the ionization and the photoelectric type and more particularly to a novel such tester which involves actual simulation of fire conditions.

3. Brief Description of the Prior Art

There are two basic types of smoke detectors. One is the ionization detector, which senses changes in the conductivity of the air in a measuring chamber or chambers under the influence of radio-active radiation. The other is the photoelectric detector which senses the scattering of light in a measuring chamber. Both devices respond to the presence of particulate matter, or particles of combustion produced by thermal decomposition. The great majority of these particles, or aerosols, are invisible (less than 0.3 micrometers in size) but the larger ones are visible in the form of smoke (0.3 micrometers to 10.0 micrometers).

Invisible aerosol is the earliest appearing fire signature noted to date. Heating of materials during the pre-ignition stage of a fire produces submicron particles ranging in size from $5 \times 10^{-4}$ to $1 \times 10^{-3}$ micrometers. These particles are generated at temperatures well below ignition temperatures.

As heating of a material progresses toward the ignition temperature, the concentration of visible aerosol increases to the point where larger particles are formed by coagulation. As this process continues, the particle size distribution becomes log normal with the most frequent sizes in the range between 0.1 and 1.2 micrometers. This is the size range to which both ionization and photoelectric devices will respond, the photoelectric device reacting to sizes 0.3 micrometers and above and the ionization to the entire range and smaller. The smaller particles, less than 0.1 micrometers disappear either by coagulation or by evaporation, and the larger particles, greater than 1.0 micrometer, are lost through the processes of sedimentation following Stokes' Law. Aerosols in this size range are remarkably stable and contain particles in both the visible and invisible aerosol signature range. This "ageing" of aerosols has been reported by Van Luik and Scheidweiler.

Smoke detectors are a widely used home safety device which are designed to protect lives and to reduce property damage by giving a warning of fire when the fire is in its earliest stage in the home. If the home is equipped with one or more smoke detectors, the alarm, typically a loud horn, given by a properly functioning smoke detector can immediately alert the home occupants, giving them the time they need to safely exit the building. How fast the detector responds is of particular importance because the time interval between the warning alarm and the spread of the fire through the household is the critical factor. A few minutes is often the difference between survival and death in the typical home fire.

Detectors may fail to alarm as required because their sensitivities have been altered over a period of time by dust, grease, corrosive fumes, moisture or by other contaminants in the area in which the detector is located. Electronic component failures are also known to occur. Aging, as well, is a factor contributing to malfunctions for these reasons. Detector manufacturers typically provide for "testing" the device by means of pressing a test button or by pulling a switch which is located on the housing of the unit. Alternatively, some (older) models can only be tested by blowing smoke in the direction of the detector, i.e., through smoke derived from a cigarette, cigar, match, candle, paper, rope, etc.

There are major disadvantages in the conventional testing of smoke detectors. Recommended placement of the smoke detector is on the ceiling or high-up on the wall. A person of average height must stand on a chair or on some elevation in order to press the button, pull the switch, or blow the smoke, thus risking physical harm, which is a serious matter for older people. At best, blowing smoke is a clumsy and primitive method for testing such devices.

The only true test for a smoke detector is one that involves creating the particular matter (aerosols) which simulates the advance or early products of combustion. Underwriters Laboratories, Inc. publishes a Standard for Safety for Single and Multiple Station Smoke Detectors (UL 217) which specifies the detection levels for an approved smoke detector. Compliance is determined by empirical tests involving, among others, flaming paper, gasoline and smoldering wood. A detector must function satisfactorily in all such tests. The levels of performance required are minimum standards, basically calling for any detector to operate an alarm when exposed to particle sizes in the range of 0.1 micrometers to 1.2 micrometers. See FIG. 4. So it is important that in testing smoke detectors the test should provide only those detectable elements within the prescribed minimum levels for an approved detector. It would be improper and ineffective to employ an "overkill" type test, such as used by Gustav Purt, et al (U.S. Pat. No. 3,693,401) wherein a housing encloses the smoke detector, creating an artificial environment into which aerosols of indeterminate size are introduced in a gross quantity. Purt's artificial environment, of course, precludes normal air flow conditions and the aerosols introduced are not limited as to quantity or appropriate size.

SUMMARY OF THE INVENTION

The problem and difficulties encountered with conventional testing of smoke detectors are obviated by the present invention which performs satisfactorily on both types of smoke detectors, ionization and photoelectric, because its chemical formulation produces a distribution of particle sizes which simulates the full range of fire conditions.

The following laboratory tests were conducted to determine the aerosol sizes of the invention:

TEST I

The test aerosol was injected into a smoke detector test tunnel to measure the apparent geometric diameter while the aerosol was being circulated in the tunnel. This tunnel is similar to the tunnels used by the Underwriters Laboratories to determine intrinsic alarm thresholds for smoke detectors.

The tunnel is equipped with a ½meter light beam which is used to measure the density of the smoke in the tunnel using the extinction principle. The tunnel is also equipped with a measuring ionization chamber which is used to measure smoke density using the ionization chamber principle. Through the use of suitable mathematics, it is possible to determine the appropriate size of the smoke particles in the tunnel from the readings obtained with the light beam and the measuring ionization chamber. Scheidweiller has described this procedure in the May 1976 issue of Fire Technology.

Using this technique, it was found that the Smoke Detector Tester's aerosol had a mean geometric diameter of 1.1 micrometer.

TEST II

In tests using a TechEcology Model 200 particle counter and a Tracor Northern Model TN-1705 multichannel pulse height analyzer, a mean geometric diameter of 0.7 micrometers (calculated from the mass median diameter) was obtained.

The measurements obtained in both tests indicate the suitability of the invention's particle sizes for the purpose intended.

The formulation is responsive to the common observation that ionization devices are more sensitive to smoke from flaming combustion, i.e., smaller particles, and that photoelectric devices are more sensitive to smoke from a smoldering source, i.e., larger particles. Specifically, a hand held aerosol container includes a finger operated dispensing means for selectively releasing a quantity of particles into the detector's sensing area. The particle size is small enough, in the case of an ionization device, to cause a voltage drop inside the ionization chamber . . . and large enough, in the case of a photoelectric device, to cause light scattering inside the detection apparatus; either condition will cause the alarm to sound, resulting in a true functional test.

Therefore, it is among the primary objects of the present invention to provide a novel smoke detector tester which may be readily employed to test the total sensing capabilities of the detector as well as the electrical circuitry connected therewith.

BRIEF DESCRIPTION OF THE DRAWINGS

The features of the present invention which are believed to be novel are set forth with particularity in the appended claims. The present invention, both as to its organization and manner of operation together with further objects and advantages thereof, may best be understood by reference to the following description, taken in connection with the accompanying drawings in which:

FIG. 1 is a diagrammatic view showing a smoke detector being tested by the tester and method thereof incorporating the present invention;

FIG. 2 is a view of an aerosol container with a finger operated valve for selectively releasing the contents thereof to form an aerosol cloud;

FIG. 3 is a graph illustrating the effectivenss of the smoke detector tester in terms of time and distance.

FIG. 4 is a graph illustrating the particle sizes and relative concentrations of various types of smoke.

DESCRIPTION OF PREFERRED EMBODIMENT

Referring to FIG. 1, a smoke detector is illustrated in general by number 10 and is shown mounted on a ceiling 11 by any suitable means. The smoke detector 10 includes a vent or grill 12 through which the smoke or other products of combustion enter the detector. For testing purposes, a user 13 is shown with a hand held aerosol container 14 having a directional means for releasing the contents thereof into a sensing area or zone adjacent to detector 10. The contents of the aerosol can or container 14 simulate the properties of smoke or other products of combustion so that the smoke detector 10 can be activated by simulated fire conditions. In this manner, the detector unit is tested not only for operability of its electrical circuitry but for its actual smoke and/or products of combustion sensing capabilities.

The aerosol can 14 as shown in FIG. 2 is of metal construction and widely used for varieties of pressurized consumer aerosol products. It is equipped with a finger operated plastic dispensing valve 16 with a very small aperture. The valve when depressed releases through the aperture a dispersion of the can contents 15 which is suitable for the purposes hereof. The preferred contents of the can 14 are a mixture of three ingredients, (a) seventy percent a hyrocarbon propellant, usually composed of 50% butane and 50% propane, said propellant is also an active ingredient in that it furnishes the majority of smaller particle sizes (0.5 micrometer and under), (b) (5% isopropyll alcohol, which serves as a carrier medium and (c) 25% dioctyl phthalate, an ester of phthalic acid, which provides the larger particle sizes (0.1 micrometers and over). All ingredients have boiling points of over 160° C.

Referring now to FIG. 3, it can be seen that the spray from the container 14 is most effective within a range of 0 inches to 5 feet (although it causes the alarm to respond at somewhat greater distances, up to 10 feet, with a correspondingly greater time lapse). Thus, a person of average height can easily test a smoke detector regardless of whether it is located on a wall or on the ceiling without needing to use a platform. Under repeated field trials, the alarm is actuated in less than 1 second and not more than 3 seconds. During the invention's intensive testing, no damage was noted involving either the circuitry or the housing of the smoke detectors used in the field trials. Further, the equivalent of eight years of normal usage of the product had no effect upon the sensing apparatus of the various brands of smoke detectors employed. A review of OSHA Regulations (29-CFR-1910-1000) indicates that the chemical formulation poses no danger to humans or to the environment under normal usage.

The graph of FIG. 3 also illustrates that the closer the spray or cloud is to the chamber 15, the faster the reaction time. This feature can also be converted to density of cloud particles causing the desired effect upon the voltage of the detection apparatus.

Referring to FIG. 4, it can be seen that the invention's test aerosol closely approximates the particle diameters produced by various types of smoke. Curve 17 is for smoldering wood smoke; curve 18 for smoldering PVC, curve 19 for burning benzene smoke and curve 20 for smoke from flaming paper.

In actual practice, the user aims the aerosol spray container 14 at the aera of the smoke detector 10 containing the vent, or grill 12. The cloud of spray 15 from the container enters through the grill into the sensing apparatus inside the detector. The pressurized propellant provides momentum for the particles to carry from the spray valve or nozzle 16 to the smoke detector. The numerals 15 in both FIGS. 1 and 2 signify the particle cloud as it approaches the smoke detector 10 after leaving the container 14. A four ounce (contents) container size was used in tests. Smaller and larger sizes would perform similarly.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a tester for simulating the presence of products of combustion for activating a smoke detector comprising a hand held pressurized container having a finger operated pressure release valve with a very small aperture which allows for direct spraying, a quantity of material stored in said container which when released under pressure will form a moving cloud of particulate matter simulating products of combustion, and a propellant included in said material which aids driving said cloud material in the desired direction so as to impact said smoke detector, The improvement consisting of:
  said cloud of particulate matter
    comprising particle sizes which produce a mean geometric diameter of approximately 0.7 micrometers to 1.2 micrometers, thereby providing an appropriate range of particulate size such as to activate alarms in both the ionization and photoelectric type of detectors at sensitivity levels which indicate the detector is functioning as intended.

2. A tester according to claim 1 in which said cloud material consists of approximately seventy percent hydrocarbon propellant, approximately five percent isopropyl alcohol and the remainder dioctyl phthalate.

3. In combination with a conventional smoke detector, a tester for simulating the presence of products of combustion for activating said smoke detector comprising:
  a hand-held pressurized container having a finger operated release valve;
  a quantity of cloud material stored in said container simulating products of combustion;
  a propellant included in said cloud material for driving said cloud material in a desired direction so as to impinge said smoke detector;
  said cloud material includes particle sizes within the range of 0.01 micrometers to 5.0 micrometers, with a median geometric diameter of 0.7 micrometers to 1.1 micrometers;
  said cloud material consists of approximately seventy percent hydrocarbon propellant, approximately five percent isopropyll alcohol and the remainder dioctyl phthalate;
  said smoke detector is of ionization type or photoelectric type and said cloud material being further characterized as being effective to increase the resistance of the radiation source output so as to produce a voltage drop therethrough in the case of the ionization type detector, or to create a light scattering effect in the case of the photoelectric type detector;
  said cloud material is characterized as having the required dispersion of particle sizes which simulate the early stages of fire.

* * * * *